United States Patent
Showalter (10) Patent No.: US 6,663,158 B1
(45) Date of Patent: Dec. 16, 2003

(54) GOLF CART BRACKET AND WINDSHIELD ASSEMBLY

(75) Inventor: Jerry M. Showalter, Wesley Chapel, FL (US)

(73) Assignee: Tampa G Manufacturing Co., Inc., Tampa, FL (US)

( * ) Notice: Subject to any disclaimer, the term of this patent is extended or adjusted under 35 U.S.C. 154(b) by 0 days.

(21) Appl. No.: 10/161,189

(22) Filed: Jun. 2, 2002

(51) Int. Cl.[7] .................................................. B60J 1/02
(52) U.S. Cl. ................... 296/96.21; 296/201; 296/84.1; 280/DIG. 5
(58) Field of Search ......................... 296/77.1, 79, 84.1, 296/96.21, 147, 136, 138, 201; 280/DIG. 5

(56) References Cited

U.S. PATENT DOCUMENTS

| | | | |
|---|---|---|---|
| 3,958,826 A | 5/1976 | Upton | 296/78 |
| 4,014,589 A | 3/1977 | Yerkey | 296/78 |
| 4,098,536 A | 7/1978 | Mills | 296/78 |
| 4,343,503 A | 8/1982 | Samuelson et al. | 296/84 |
| 4,488,750 A | 12/1984 | Gerber | 296/78 |
| 4,621,859 A | 11/1986 | Spicher | 296/78 |
| 4,773,694 A | 9/1988 | Gerber | 296/77.1 |
| 4,773,695 A | 9/1988 | Jones et al. | 296/77.1 |
| 4,792,175 A | 12/1988 | Gerber | 296/79 |
| 4,795,205 A | 1/1989 | Gerber | 296/77.1 |
| 4,819,979 A | 4/1989 | Moglia | 296/77.1 |
| 5,110,174 A | 5/1992 | Andree | 296/77.1 |
| 5,192,109 A | 3/1993 | Roberts | 296/84.1 |
| 5,195,797 A | 3/1993 | Hobbs | 296/77.1 |
| 5,259,656 A | 11/1993 | Carroll | 296/77.1 |
| 5,310,235 A | 5/1994 | Seymour et al. | 296/77.1 |
| 5,568,953 A | 10/1996 | Showalter | 292/194 |
| 5,975,615 A | 11/1999 | Showalter | 296/96.21 |

Primary Examiner—Stephen T. Gordon
Assistant Examiner—Patricia L. Engle
(74) Attorney, Agent, or Firm—Holland & Knight LLP (57) ABSTRACT

Windshield retaining brackets having a generally S-shape configuration that are attachable to opposing roof structure supports of the roof of a golf cart. The S-shape is defined by a first outer transverse member, a first outer longitudinal member, a middle transverse member, a second outer longitudinal member and a second outer transverse member. The first outer transverse member, the first outer longitudinal member and the middle transverse member define a frame slot. The frame slot of the S-shaped retaining bracket is positioned about the roof structure support and a windshield slot defined by the middle transverse member, the second outer longitudinal member and the second transverse member is positioned within notches formed in the edges of the windshield to secure the windshield to the roof structure supports.

15 Claims, 9 Drawing Sheets

GOLF CART BRACKET AND WINDSHIELD ASSEMBLY

BACKGROUND OF THE INVENTION

1. Field of the Invention

This invention relates to windshields for golf carts. More particularly, this invention relates to retaining brackets for golf cart windshields that retain the windshield in position about the front of the golf cart.

2. Description of the Background Art

Golf carts are typically motorized vehicles, gas or electric, that comprise a body portion including a driver's seat and a passenger seat with a storage area in the rear for storing a pair of golf bags in an upright position. Most golf carts include a roof structure positioned above the body portion by means of four upright corner supports. The roof structure provides at least partial protection to the golfers in the golf cart during inclement weather such as rain, and also at least partially shades the golfers during sunny weather.

Golf cart roof structures do not provide complete protection since the front, rear and sides are open. Accordingly, there presently exist numerous types of enclosures for golf carts which are designed to provide added protection to the golfers seated therein. Generally, golf cart enclosures are composed of a canvas or vinyl material having a plurality of panels which are configured to be supported about the front, rear and side openings of the golf cart. The panels in some of these enclosures are suspended directly from the roof structure of the golf cart whereas others are suspended from a canvas or vinyl roof panel designed to be positioned over the roof structure of a golf cart so that the panels are suspended downwardly therefrom about the front, rear and side openings of the golf cart. Various means are provided for securing the lower edges of the panels to the lower edges of the golf cart in order to retain them in proper position. Most importantly, the front and typically the rear and side panels include sections of transparent vinyl which function as windshields or windows permitting the golfers to see out of the golf cart when fully enclosed in the enclosure. Representative golf cart enclosures are described and illustrated in U.S. Pat. Nos. 5,259,656, 4,621,859, 5,310,235, 4,773,694, 4,098,536 and 4,488,750, the disclosures of which are hereby incorporated by reference herein.

The earliest models of golf cart enclosures included four panels (front, rear and side panels) as described above. However, it was soon realized that most golfers kept the front panel rolled down to function as a windshield even during good weather conditions. Golfers particularly favored keeping the front panel rolled down to function as a windshield to block the flow of air during operation of the golf cart. These front panels soon became known as "soft" fronts or windshields, and were particularly favored by golfers during cooler weather and light rain, because the soft windshield sufficiently deflected oncoming air to keep the golfers comfortable during movement of the golf cart. In many situations, the soft windshields were left in place almost year round.

Windshields composed of transparent hard materials such as a transparent acrylic or glass, for golf carts were soon developed. These became known as "hard" windshields to distinguish them from the "soft" windshields composed of the transparent vinyl front panel of a golf cart enclosure. Indeed, golf cart enclosures were soon being manufactured as "four-sided" versions with a front panel having a soft front or windshield, paired side panels, and a rear panel and "three-sided" versions having only side panels and a rear panel intended to be used on golf carts with hard windshields.

Presently, there exists many types of hard windshields. Some are composed simply of a flat, hard transparent material that is permanently affixed to the front roof structure supports, others are entirely removable and still others are connected to the roof structure supports in such a manner that the windshield may be rolled on tracks out of the way up under the roof structure. Representative windshields for golf carts are described and illustrated in U.S. Pat. Nos. 5,975,615, 5,195,797, 5,192,109, 5,110,174, 4,819,979, 4,795,205, 4,792,175, 4,773,695, 4,343,503, 4,014,589 and 3,958,826, the disclosures of which are hereby incorporated by reference herein.

One particular type of hard windshield consists of lower and upper sheets of transparent material, such as clear acrylic or polycarbonate, that are dimensioned to be positioned about the lower and upper openings of the golf cart, with the sides thereof secured to the left and right front roof structure supports, thereby functioning as lower and upper window panes of the windshield. The mating edges of the lower and upper windshields are hinged connected together such as by means of a living hinge or the like. The opposing sides of the lower windshield are secured to the front upstanding roof supports by means of threaded fasteners, rivets, or the like. Because of the living hinge, the upper portion windshield is permitted to fold down over the lower portion windshield in a stacked, parallel configuration such that the upper area of the front of the golf cart is "open". When desired, the upper portion windshield may then be pivoted upwardly to a position substantially planar with the lower portion windshield, thereby "closing" the upper area of the front of the golf cart. Fastener means are provided for securing the upper portion windshield in such a "closed" position. In the industry, these types of windshields became known as "hinged windshields".

Presently, there exists numerous means for securing the upper pane of the windshield of the hinged windshield of the golf cart to the front upstanding supports of the roof structure. Historically, a hook and loop fastener such as that known by the trademark "Velcro" was first used by adhering one component of the fastener (hook or loop) to the opposing side edges of the upper pane of the windshield and adhering the other component of the fastener (loop or hook) to the front surface of the front roof structure supports. In this manner, as the upper pane is moved to the vertical, closed position, the components of the hook and loop fastener are engaged and securely retains the upper pane in the closed position. However, due to the nature of the hook and loop fasteners, it is sometimes difficult for the golfer to pull the hook and loop fastener apart in order to lower the upper pane of the windshield.

Another type of fastener for golf cart hinged windshields comprises generally U-shaped retainer clips that are dimensioned and configured to resiliently grasp about the roof structure supports. Typically, one of these U-shaped clips is rigidly connected to each opposing side of the upper pane of the windshield such that when the upper pane is closed, the U-shaped retainer clips snaps onto their respective roof structure supports, thereby securing the upper pane in its closed position. Importantly, the golfer can easily open the upper pane since U-shaped clips of this structure can more easily release from the upstanding supports than hook and loop type fasteners.

Still another type of fastener for golf cart hinged windshields comprises a rubber latch. Rubber latches of this type are permanently affixed to the front roof structure supports. They include an L-shaped or U-shaped configuration that can be bent backward during closing of the upper pane of the windshield and then released to resiliently engage the opposing side edges of the upper pane when closed. Rubber latches of this character tend to lose their inherent "memory" after repeated use thereby requiring replacement.

Still other types of fasteners for golf cart hinged windshields include articulated knobs or latches positioned through holes in the opposing sides of the pane of the windshield in such manner that when the upper pane is closed, the knob or latch can be operated to rigidly engage into a hole in the supports or a bracket affixed to the supports, respectively. Unfortunately, articulated knobs and latches of this character require holes to be drilled through the opposing sides of the upper pane, thereby increasing the manufacturing cost since acrylic is notch sensitive and relatively brittle. Moreover, repeated operation of the knob or latch of this character sometimes results in a degradation of the hole in the acrylic.

Still another type of latch has been patented by the applicant of the present invention (U.S. Pat. No. 5,568,953, the disclosure of which is incorporated by reference herein) for an improved retaining latch for golf cart hinged windshields. In the referenced patent, the applicant created an S-shaped latch which held the upper pane of a hinged windshield securely in place. The improved latch does not degrade over time and allows a person to easily latch or unlatch the upper pane of the hinged windshield on the golf cart.

Another type of hard windshield used on golf carts is a solid or one piece (no hinge) windshield. The one piece windshields, as well as the lower pane of the hinged windshields, require a retaining device to hold the windshield to the posts of the golf cart. The prior art uses a plastic bracket in which two "U" shaped slots are positioned 90° to each other. The prior art teaches that the plastic brackets are to be slid onto the side edges of the lower pane of the hinged windshield or onto the side edges of the solid windshield to an approximate middle location. The windshield can then be attached to the posts of the golf cart by placing the brackets over the posts allowing the "U" shaped portion to engage with the posts of the golf cart. Note particularly U.S. Pat. No. 5,975,615 that teaches a U-shaped bracket including a slot for receiving the opposing side edges of the lower pane of the windshield for fastening to the side frame supports.

Finally, as shown in FIGS. 1a, 1b, 2 and 3, still another type of windshield retaining bracket 10 for a golf cart 12 comprises a squared S-shaped bracket 20 having perpendicularly-connected first outer transverse member 22, first outer longitudinal member 24, the middle transverse member 26, second outer longitudinal member 28 and second outer transverse member 30 that define a squared "S" configuration. The first outer transverse member 24, the first outer longitudinal member and the middle transverse member define a first U-shaped slot 40 dimensioned to snap onto the upstanding frame supports. A second U-shaped slot 42 is defined by the middle transverse member 26, the second outer longitudinal member 28 and the second outer transverse member 30 and dimensioned to receive the side edge of the lower pane of the windshield.

During assembly, first bottom brackets 10 are installed. The side brackets 10 are then installed. As better shown in FIG. 2, each side bracket 10 is installed by positioning the frame slot 40 of the S-shaped retaining bracket 20 onto the opposing side supports 34 and then sliding it down along the opposing support 34 along the side edges of the windshield 16. At the same time, the windshield slot 42 is slid over the side edges of the windshield 16 as the frame slot 40 of the bracket 20 is slid over the supports 34. Notably, the two "U" shaped slots 40 and 42 are at 180° to each other and therefore serve the purpose of securing engaging the windshield 16 to the supports 34 of the golf cart 12.

Unfortunately, experience has shown that the brackets 20 tend to slip further downwardly along the supports 34 and, over time, may ultimately be positioned at the bottom of the supports 34. The tendency to slip is acute with increased jarring and bumping, such as during driving of the golf cart 12 over uneven terrain. Therefore, there presently exists a need for preventing the brackets 20 from sliding downwardly along the windshield 16 and supports 34. Similar problems are encountered when utilizing the brackets taught by U.S. Pat. No. 5,975,615.

Therefore, it is an object of this invention to provide an improvement which overcomes the aforementioned inadequacies of the prior art devices and provides an improvement which is a significant contribution to the advancement of the golf cart windshield art.

Another object of this invention is to provide an improved retaining bracket and notched windshield combination for a golf cart that, once installed, the brackets are prevented from slipping out of position along the sides of the windshield.

Another object of this invention is to provide an improved retaining bracket and notched windshield combination that is easily installed yet is secured into position to prevent slipping of the brackets during use.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises two embodiments of improved retaining brackets for use with a notched windshield for golf carts. More particularly, both embodiments of the brackets of this invention comprise an "S" shaped bracket defining a first U-shaped slot for securing to the opposing supports of the golf cart and a second U-shaped slot for receiving the opposing side edge of the windshield (the U-shaped slot for receiving the supports is referred to herein as the "frame slot" whereas the U-shaped slot for receiving the panes of the windshield is referred to herein as the "windshield slot"). The improved notched windshield of the invention comprises two embodiments—one with opposing upper side notches formed inwardly along the upper opposing edges of the windshield and another with opposing middle side notches formed inwardly along the middle portion of the edges of the windshield.

During assembly, the respective first or second embodiment of the bracket is intended to be used with the first or second embodiment of the windshield. In both embodiments, the distance between the opposing notches is equal to the distance between the windshield slots of the opposing brackets.

In the case of the first embodiment of the bracket and notched windshield, the frame slots of the brackets are installed on the respective opposing supports and then slid downwardly such that their windshield slots fit into the opposing upper side notches of the windshield. In the first embodiment, the locking nature of the bracket with the upper side notches of the windshield prevents the bracket from slipping further downwardly along the edge of the windshield.

In the case of the second embodiment of the bracket and notched windshield, the windshield slots of the brackets are installed on the respective opposing middle side notches of the windshield and then the windshield with the attached brackets are assembled to the opposing side supports by pushing the frame slots onto the supports. A fastener is then used to fixedly secure the bracket to the support. In the second embodiment, the locking nature of the bracket with the middle side notches of the windshield serves to hold-up the windshield and prevent it from rubbing on the cowling of the golf cart.

It is noted that without departing from the spirit and scope of the invention, both of the embodiments of the brackets and notched windshield may be incorporated into the same windshield.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Figures 1A, 1B:
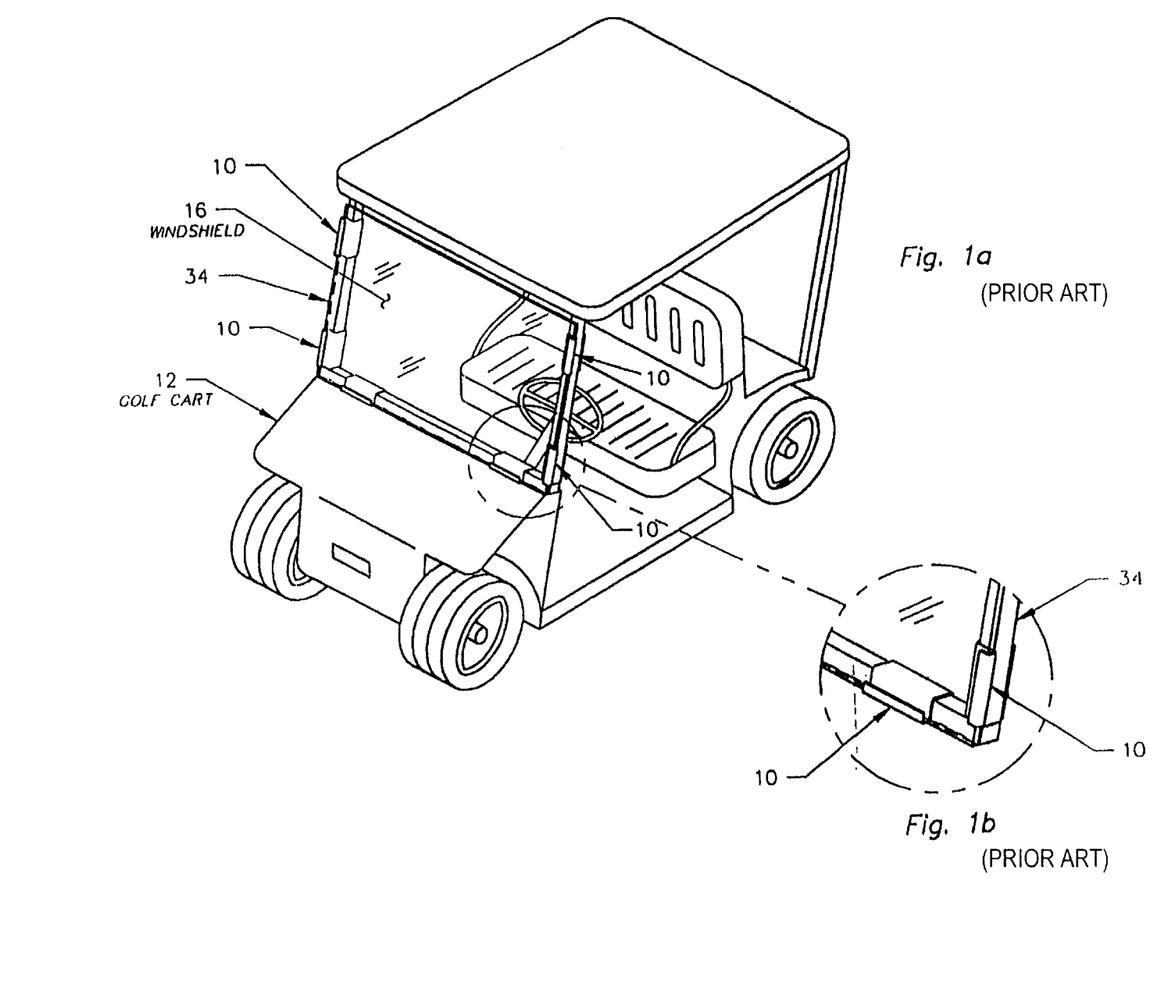
FIG. 1a is a perspective view of a golf cart illustrating a prior art windshield attached to the golf cart.
FIG. 1b is an enlarged partial view of a front roof support of a golf cart illustrating a windshield attached to a support by a prior art retaining bracket.

Referring to FIGS. 1a and 1b, prior art retaining brackets 10 are intended to be used in conjunction with a windshield 16 and a roof support 34 of a golf cart 12.

Figure 2:
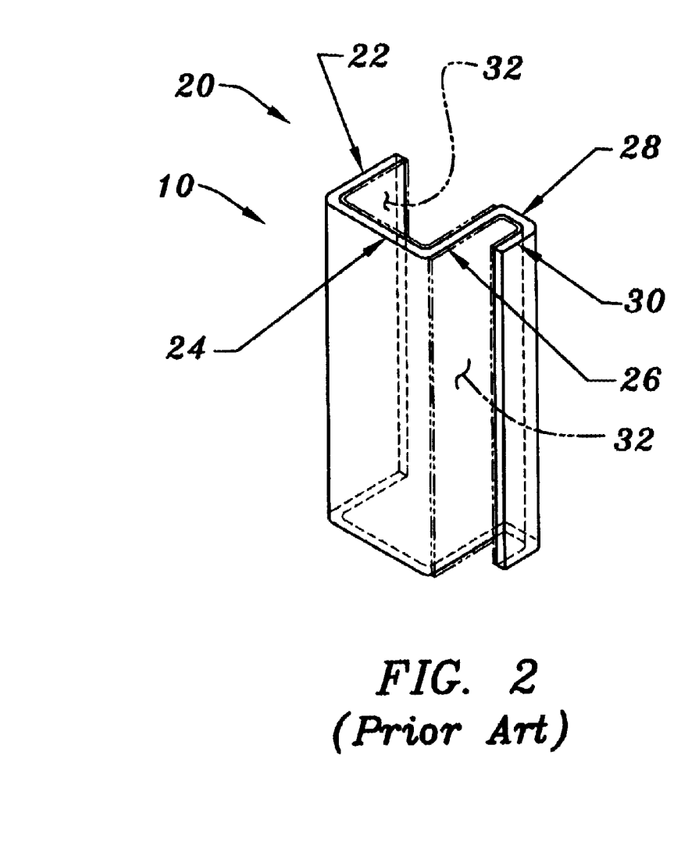
FIG. 2 is a plan view of a prior art squared S-shaped bracket illustrating the transverse and longitudinal members thereof and illustrating cushioning in phantom.

The prior art retaining bracket 10 functions to retain the windshield 16 in position attached to the front roof supports 34 of the golf cart 12. As best shown in FIG. 2, the prior art retaining bracket 10 comprises a squared S-shaped bracket 20 having serially connected the first outer transverse member 22, the first outer longitudinal member 24, the middle transverse member 26, the second outer longitudinal member 28 and the second outer transverse member 30 perpendicular to adjacent members to define the squared "S" configuration. Members 22–30 may be coated with plastic 32 or another cushioning material to prevent rattling or vibration of the windshield 16.

Figure 3:
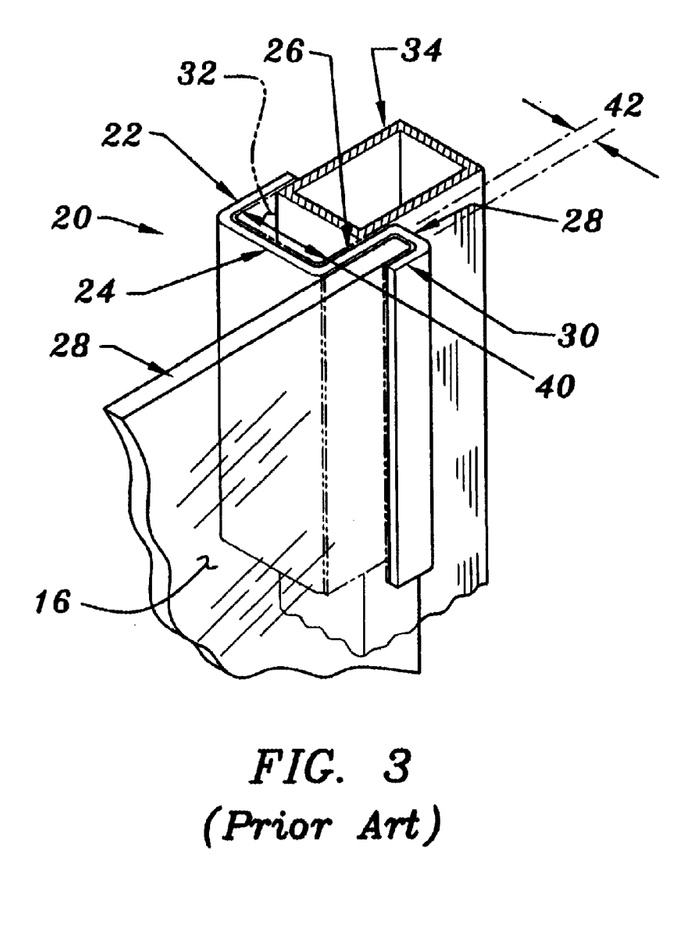
FIG. 3 is an enlarged partial cross-sectional view of the front support of a golf cart and an enlarged cross sectional view of a windshield illustrating a windshield secured by a prior art retaining bracket.
Figure 4:
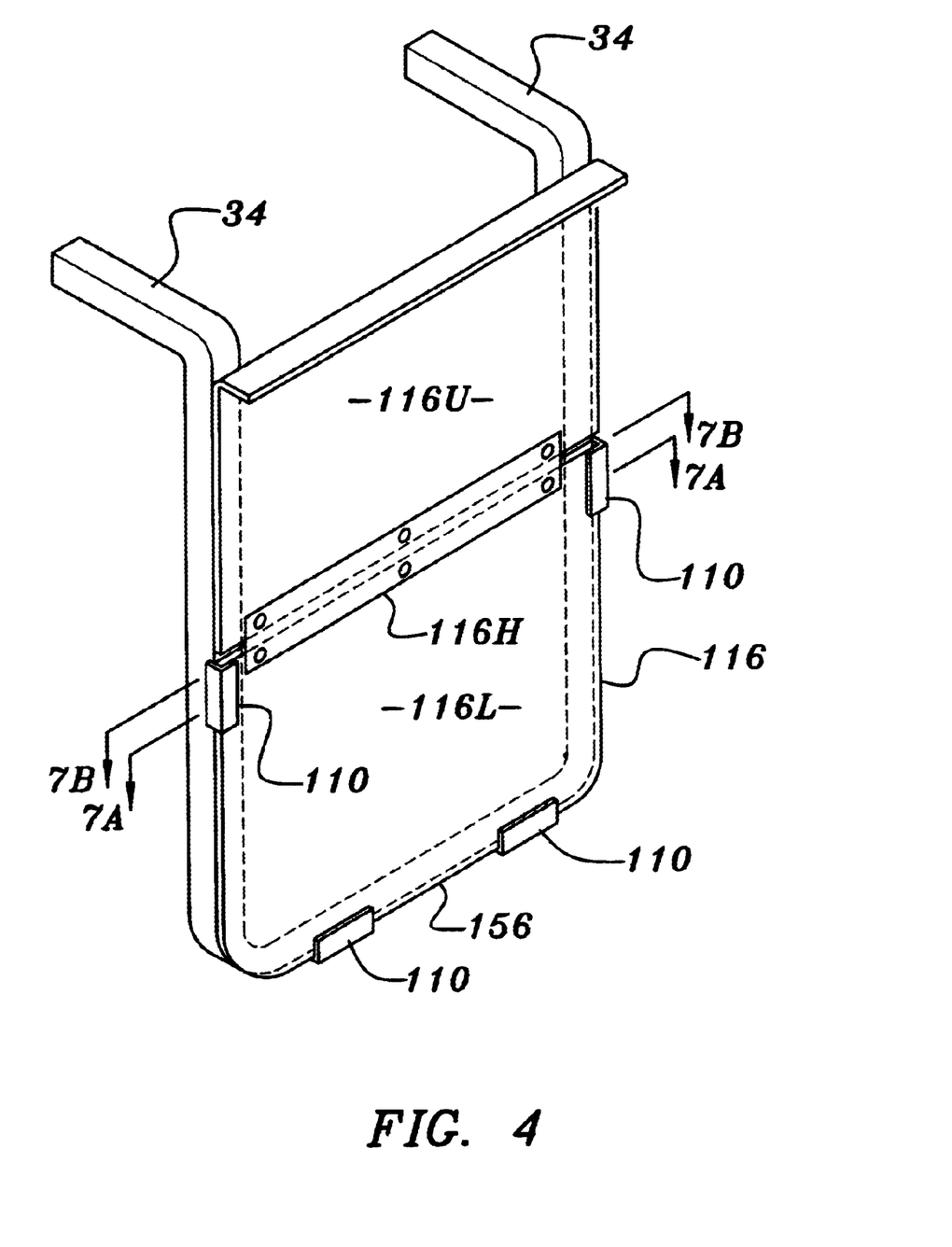
FIG. 4 is a partial perspective view of the opposing front supports of a golf cart and the first embodiment of the windshield and retaining bracket of the present invention in which the upper opposing side edges of the windshield are notched to receive the windshield slots of the respective opposing brackets and prevent the brackets from sliding further downwardly.

As shown in FIG. 3, the prior art squared S-shaped bracket 20 is positioned such that the frame slot 40 defined by the first outer transverse member 22, the first outer longitudinal member 24, and the middle transverse member 26 is positioned about the roof structure support 34 and is dimensioned to be slid down the support 34. A windshield slot 42 defined by the middle transverse member 26, the second outer longitudinal member 28 and the second outer transverse member 30 is dimensioned to be slid over the side edge 18 of the windshield 16 as the frame slot 40 is slid along the support 34, thereby securely engaging the windshield 16 to the support 34 of the golf cart 12.

Figure 5:
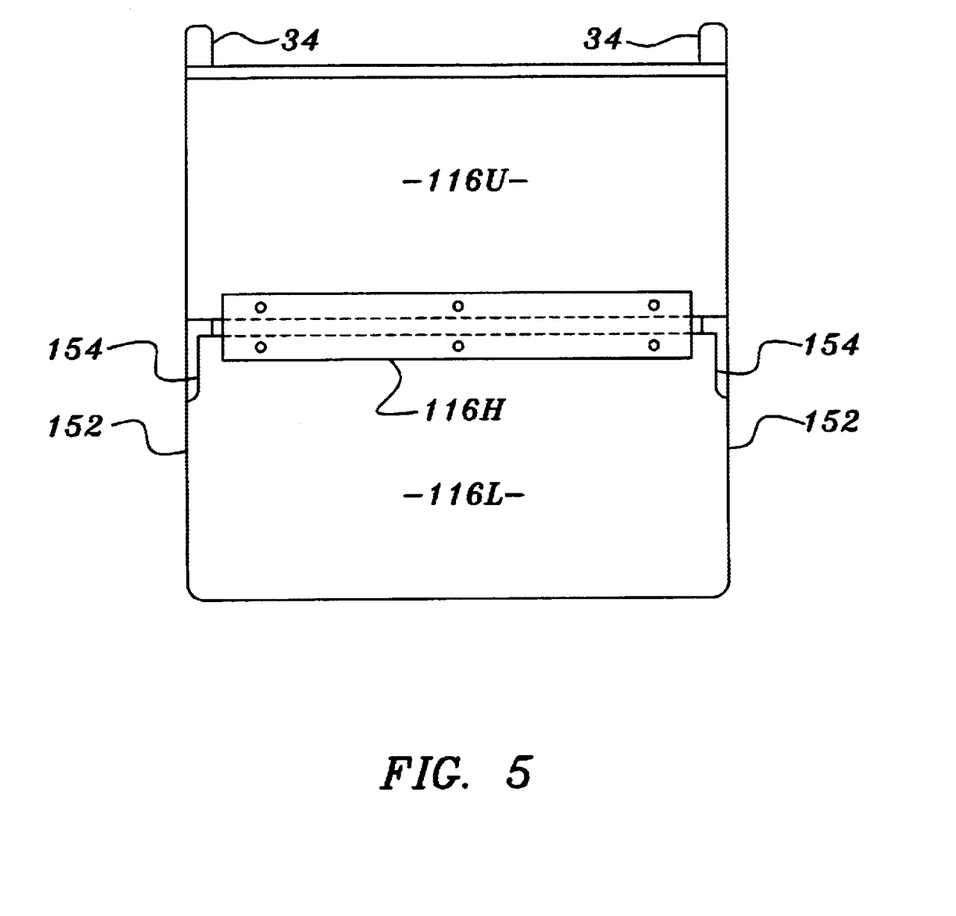
FIG. 5 is a front view of the opposing front supports of a golf cart and the first embodiment of the windshield of the present invention showing the notches formed in the upper opposing side edges thereof for receiving the opposing brackets of the invention.

FIGS. 4–7 illustrate the first embodiment of the brackets 110 and windshield 116 combination of the present invention. More particularly, the brackets 110 of the present invention comprise a configuration that is essentially the same as that of the prior art brackets 10 as described above. However, as best shown in FIG. 5, the windshield 116 of the present invention comprises upper and lower panes 116U and 116L hinged together by a hinge 116H. Each of the panes 116U and 116L have a width that is dimensioned to overlay and preferably be flush with the side supports 34 of the golf cart 12.

The upper opposing edges 152 of the lower pane 116L of the windshield 116 are each provided with a notch 154. The length of each of the notches 154 is substantially equal to the length of the bracket 110 and the depth of each of the notches 154 is substantially equal to the thickness of the second outer transverse member 130 of the bracket 110.

During assembly, two bottom brackets 110 are installed onto the bottom support 34 via their frame slots 140. The panes 116U and 116L of the windshield 116 are overlaid onto the opposing supports 34 and slide downwardly such that the bottom edge 156 the lower pane 116L engages into the windshield slots 42 of the bottom brackets 110.

Figure 6:
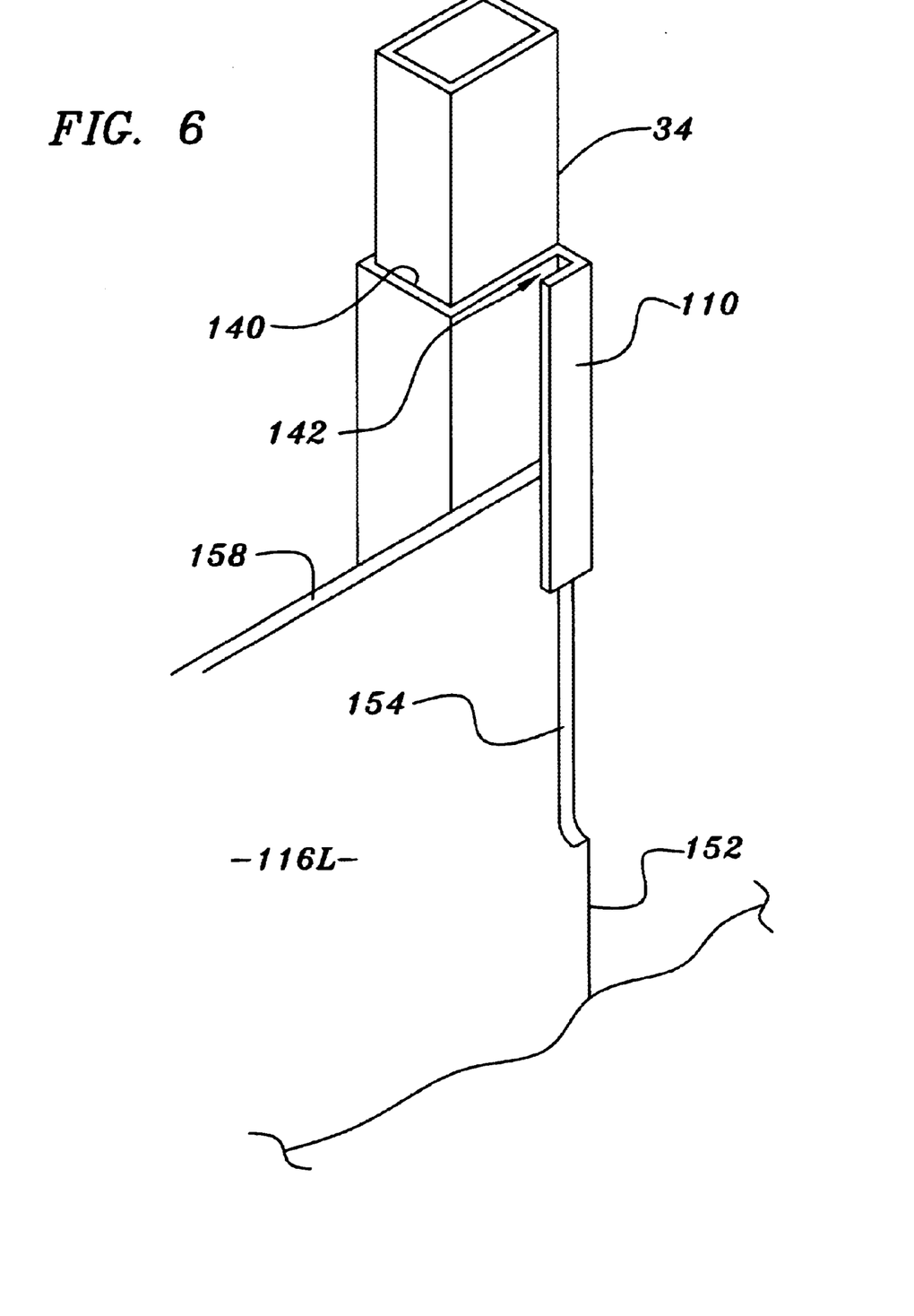
FIG. 6 is a partial perspective view showing the first embodiment of the retaining bracket of the present invention being installed onto the notch formed in the upper edge of the windshield.

As best shown in FIG. 6, in order to assemble the opposing side brackets 110, they are first installed onto the respective side supports 34 via their frame slots 140 underneath the upper pane 116U and above the upper edge 158 of the windshield 116 (typically there is enough play in the hinge 116H to allow the upper pane 116U to flex outwardly to allow the brackets 110 to be installed underneath). The brackets 110 are then each slid downwardly along the supports 34 with their windshield slots 42 being aligned with the lower pane 116L such that the notched upper side edges 152, 154 thereof slid fully into the windshield slots 42.

Figure 7A:
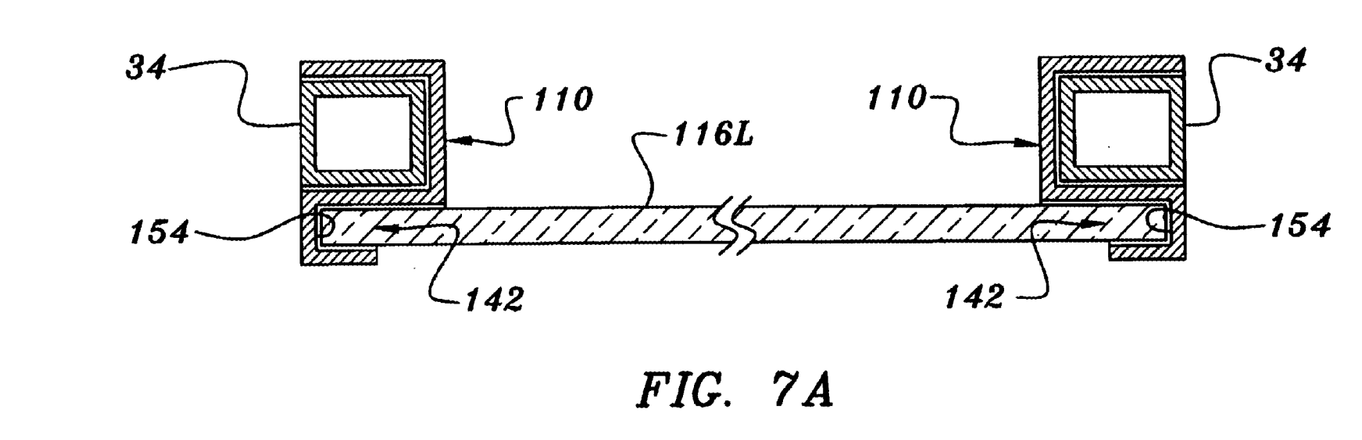
FIGS. 7A and 7B are cross-sectional views of FIG. 4 showing the first embodiment of the retaining bracket of the invention being fully installed onto the notch formed in the upper edge of the lower pane of the windshield.
Figure 7B:
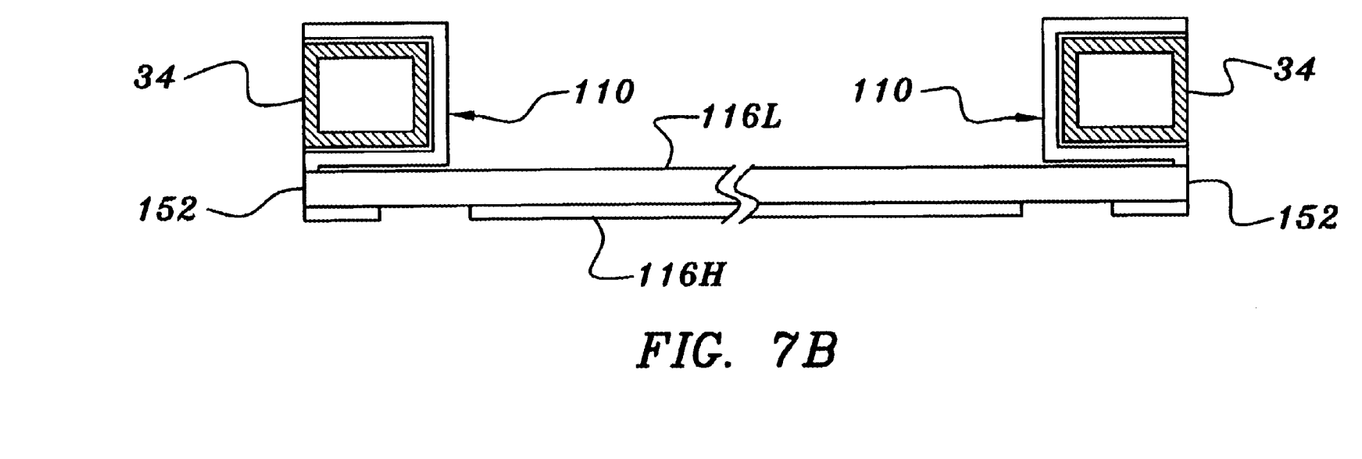

As shown in FIG. 7, the brackets 110 are prevented from sliding any further down along the supports 34 beyond the notches 154 once they bottom-out in the notches 154. Importantly, the distance between the opposing notches 154 must be substantially equal to or slightly less than the distance between the windshield slots 142 of the opposing brackets 110 mounted to the opposing side supports 34 to allow the brackets 110 to be slid downwardly into position. In contrast, if the distance between the opposing notches 154 was greater than the distance between the windshield slots 142 of the opposing brackets 110 mounted to the opposing side supports 34, both of the brackets 110 could not be slid downwardly into position. Conversely, if the distance between the opposing notches 154 was reduced too much (i.e., by a distance equal to or greater than the width of the second outer transverse member 30), one of the brackets 110 could be undesirably slid downwardly past the notch 154.

Inasmuch as the depth of the notches 154 and the thickness of the second outer longitudinal member 28 are substantially equal and inasmuch as the lengths of the brackets 110 and the notches 154 are substantially equal, the brackets 110 are flush with the edge of the lower pane 116L.

Figure 8:
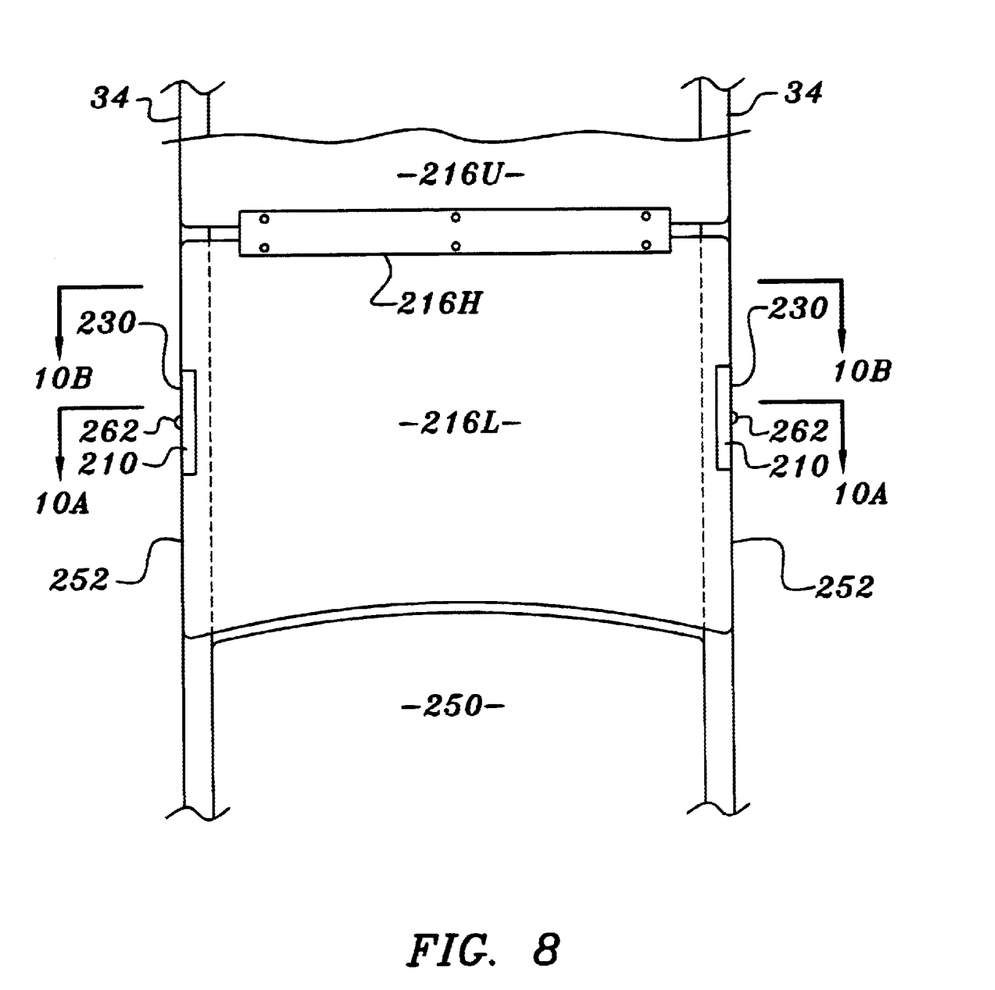
FIG. 8 is a front elevational view of one of the opposing front supports of a golf cart and the second embodiment of the windshield and retaining brackets of the present invention in which the middle portion of the opposing edges of the windshield are notched to receive the windshield slots of the respective opposing brackets and prevent them from sliding further downwardly.
Figure 9:
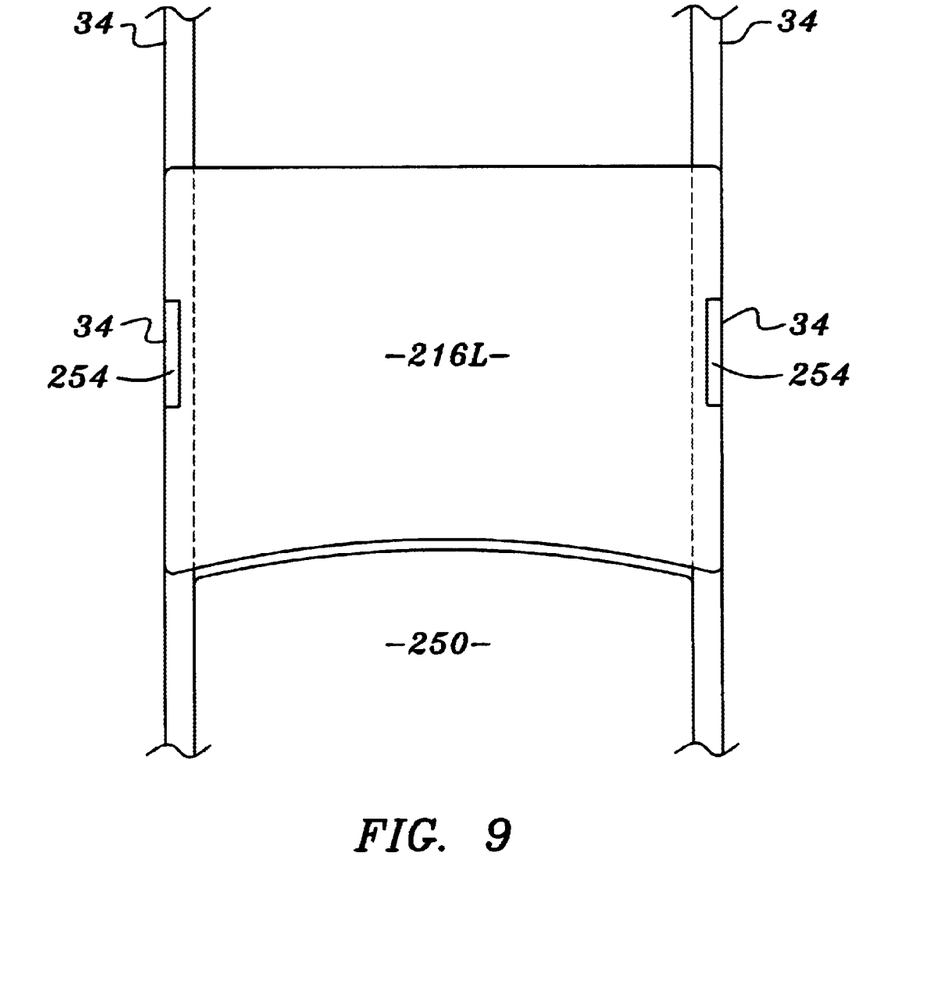
FIG. 9 is a front elevational view of the opposing front supports of a golf cart and the second embodiment of the windshield of the present invention showing the notches formed in the middle portion of the opposing edges thereof for receiving the opposing brackets of the invention.
Figure 10A:
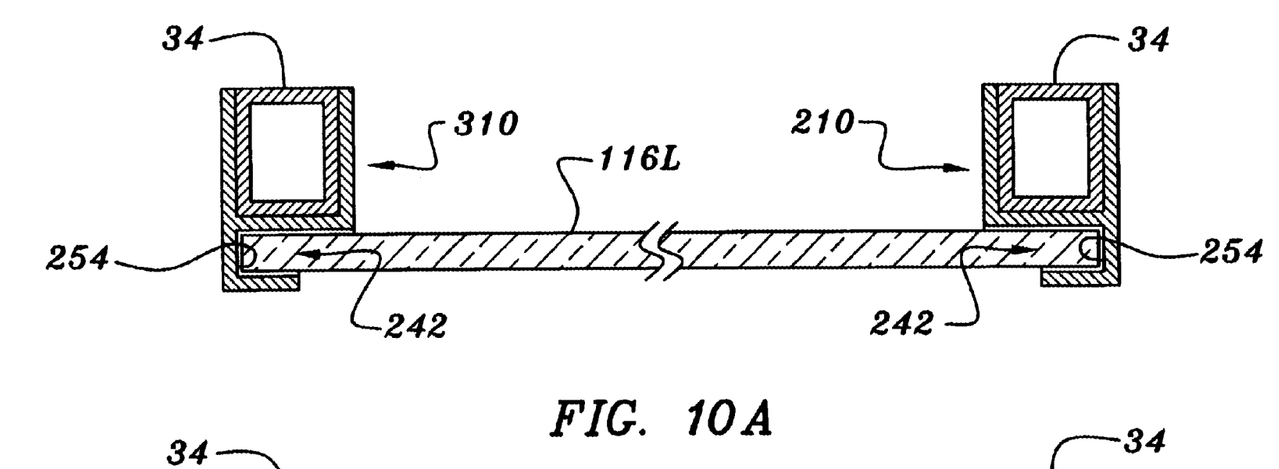
FIGS. 10A and 10B are cross-sectional views of FIG. 8 showing the second embodiment of the retaining bracket of the invention being fully inistalled within the notch formed in the middle side edges of the windshield.
Figure 10B:
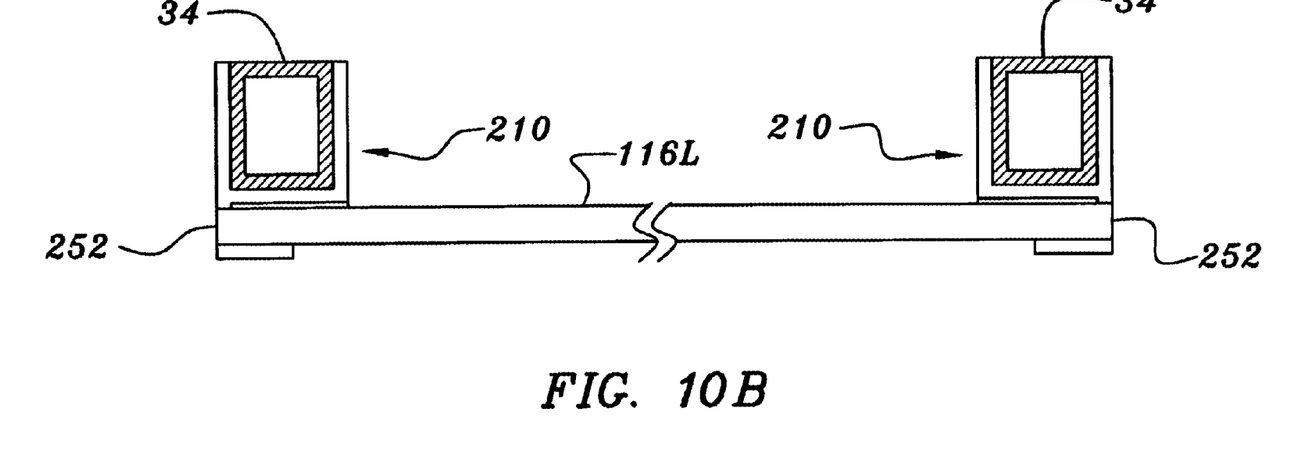

FIGS. 8–10 illustrate the second embodiment of the brackets 210 and windshield 216 combination of the present invention. More particularly, the brackets 210 of the present invention comprise a configuration that is essentially the same as that of the prior art brackets described in U.S. Pat. No. 5,975,615. However, similar to that of the first embodiment, the windshield 216 of the present invention comprises upper and lower panes 216U and 216L hinged together by a hinge 216H. Each of the panes 216U and 216L have a width that is dimensioned to overlay and preferably be flush with the side supports 34 of the golf cart 12.

The middle portion of the opposing side edges 252 of the lower pane 216L of the windshield 216 are each provided with a notch 254. The length of each of the notches 254 is substantially equal to the length of the bracket 210 and the depth of each of the notches 254 is substantially equal to the thickness of the second outer transverse member 230 of the bracket 210.

The second embodiment of the brackets 210 has particular application for use when it is desirous to secure the lower pane 216L of the windshield 216 in a position slightly above the cowl 260 of the golf cart to prevent the lower pane 216L from slipping down and otherwise rubbing against and therefore marring the cowl 250. In order to assemble the opposing side brackets 210, they are first installed onto the respective notches 254 via their windshield slots 42. The brackets 210 and the lower pane 216L are then snapped-fitted onto the respective opposing side supports 34. A rivet 262 is then installed through each of the brackets 210 into the supports 34 to thereby prevent the brackets 210 from sliding along the supports 34 (many other fasteners may be used without departing from the spirit and scope of this invention). Being fixed connected to the supports 34 and being secured within the notches 254 via the windshield slots 42, the lower pane 216L of the windshield 216 may be secured above the cowl 260 as desired. Importantly, the distance between the opposing notches 254 must be substantially equal to or slightly less than the distance between the windshield slots 242 of the opposing brackets 210 mounted to the opposing side supports 34 to allow the brackets 210 to be snapped-fitted onto the supports 34. In contrast, if the distance between the opposing notches 254 was greater than the distance between the windshield slots 242 of the opposing brackets 210 mounted to the opposing side supports 34, both of the brackets 210 could not be snap-fitted into position. Conversely, if the distance between the opposing notches 254 was reduced too much (i.e., by a distance equal to or greater than the depth of the windshield slot 242), the lower window pane 116L could fall out between the brackets 210 or could be undesirably slid downwardly past the notch 254.

The brackets 110 and 210 may be manufactured of a metallic or non-metallic material. More particularly, brackets 110 or 210 comprise an extruded aluminum or plastic material.

Inasmuch as the depth of the notches 254 and the thickness of the windshield slot 242 are substantially equal and inasmuch as the lengths of the brackets 210 and the notches 254 are substantially equal, the brackets 210 are flush with the edge of the lower pane 216L.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A retaining bracket and windshield combination for affixing to upstanding opposing supports of a golf cart, comprising in combination:

a windshield having at least one pane, the pane having a width substantially equal to the distance between the upstanding supports of the golf cart to overlay the supports, the windshield having notches formed in upper opposing sane edges of said pane, each said notch being defined by a generally flat bottom notch edge and opposing side notch edges, said generally flat bottom notch edge being substantially parallel to the respective pane edge;

a pair of S-shaped brackets for respective connection to the opposing supports, each said bracket having a first outer transverse member, a first outer longitudinal member, a middle transverse member, a second outer longitudinal member and a second outer transverse member, a frame slot being defined by said first outer transverse member, said first outer longitudinal member, and said middle transverse member and a windshield slot defined by said middle transverse member, said second outer longitudinal member and said second transverse member;

said frame slot being dimensioned to receive and slide along the supports and said windshield slot having a length substantially equal to a length of said flat bottom notch edge thus being dimensioned to receive said flat bottom notch edge of said notch;

a distance between said flat bottom notch edge of said notches of said upper opposing edges of said pane being substantially equal to a distance between said windshield slots, whereby the brackets are installed onto the supports by windshield slot being slid downwardly along said supports from a position above said pane to a position along said notches to thereby securely attach said windshield to said support of said golf cart.

2. A retaining bracket and windshield combination as set forth in claim 1, wherein said first outer transverse member, said first outer longitudinal member, said middle transverse member, said second outer longitudinal member and said second outer transverse member of said S-shaped bracket are each substantially perpendicular to their respective serially connected members.

3. The retaining bracket as set forth in claim 1, wherein said S-shaped bracket comprises a substantially squared S-shape.

4. The retaining bracket as set forth in claim 1, wherein said S-shaped bracket is made of a metallic material.

5. The retaining bracket as set forth in claim 1, wherein said S-shaped bracket includes a cushion.

6. The retaining bracket as set forth in claim 1, wherein said first slot is larger than said second slot.

7. A method for affixing a windshield to upstanding opposing supports of a golf cart, comprising the steps of:

positioning the windshield having at least one pane, the pane having a width substantially equal to the distance between the upstanding supports of the golf cart to overlay the supports, the windshield having notches formed in upper opposing sane edges of said pane, each said notch being defined by a generally flat bottom notch edge and opposing side notch edges, said generally flat bottom notch edge being substantially parallel to the respective pane edge;

connecting a pair of S-shaped brackets to the opposing supports, each said bracket having a first outer transverse member, a first outer longitudinal member, a middle transverse member, a second outer longitudinal member and a second outer transverse member, a frame slot being defined by said first outer transverse member, said first outer longitudinal member, and said middle transverse member and a windshield slot defined by said middle transverse member, said second outer longitudinal member and said second transverse member;

dimensioning said frame slot to receive and slide along the supports and dimensioning windshield slot to have a length substantially equal to a length of said flat bottom notch edge thus being dimensioned to receive said flat bottom notch edge of said notch;

dimensioning the distance between said flat bottom notch edge of said notches of said upper opposing edges of said pane to be substantially equal to the distance between said windshield slots; and installing the brackets onto the supports by sliding downwardly said windshield slot along said supports from a position above said pane to a position along said notches to thereby securely attach said windshield to said supports of said golf cart.

8. A retaining bracket and windshield combination for a affixing to upstanding opposing supports of a golf cart, comprising in combination:

a windshield having at least one pane, the pane having a width substantially equal to the distance between the upstanding supports of the golf cart to overlay the supports, the windshield having notches formed in opposing side edges of said pane, each said notch being defined by a generally flat bottom notch edge and opposing side notch edges, said generally flat bottom notch edge being substantially parallel to the respective pane edge;

a pair of S-shaped brackets for respective connection to the opposing supports, each said bracket having a frame slot for receiving one of the supports and a windshield slot for receiving one of said edges of said pane;

said frame slot being dimensioned to receive the supports and said windshield slot having a length substantially equal to a length of said flat bottom notch edge thus being dimensioned to receive said flat bottom notch edge of said notch;

a distance between said flat bottom notch edge of said notches of said opposing side edges of said pane being substantially equal to a distance between said windshield slots; and a fastener securing each of the brackets to said supports.

9. A retaining bracket and windshield combination as set forth in claim 8, wherein said frame slot and said windshield slot are substantially perpendicular to each other.

10. The retaining bracket as set forth in claim 8, wherein said S-shaped bracket comprises a substantially squared S-shape.

11. The retaining bracket as set forth in claim 8, wherein said S-shaped bracket is made of a metallic material.

12. The retaining bracket as set forth in claim 8, wherein said S-shaped bracket includes a cushion.

13. The retaining bracket as set forth in claim 8, wherein said frame slot is larger than said windshield slot.

14. A method for affixing a windshield to upstanding opposing supports of a golf cart, comprising the steps of:

positioning the windshield having at least one pane, the pane having a width substantially equal to the distance between the upstanding supports of the golf cart to overlay the supports, the windshield having notches formed in opposing side edges of said pane, each said notch being defined by a generally flat bottom notch edge and opposing side notch edges, said generally flat bottom notch edge being substantially parallel to the respective pane edge;

connecting a pair of S-shaped brackets, each said bracket having a frame slot and a windshield slot, to the side edges of said pane by dimensioning said frame slot to receive the supports and dimensioning windshield slot to have a length substantially equal to a length of said flat bottom notch edge thus being dimensioned to receive said flat bottom notch edge of said notch;

dimensioning the distance between said flat bottom notch edge of said notches of said upper opposing edges of said pane to be substantially equal to the distance between said windshield slots; and installing the brackets onto pane by fitting the windshield slots onto the respective notches of the pane and then fitting the frame slot onto the respective supports.

15. The method of claim 14, further including the step of fastening each of the brackets to the respective supports.

* * * * *